United States Patent
Seki et al.

(10) Patent No.: US 10,081,383 B2
(45) Date of Patent: Sep. 25, 2018

(54) STEERING DEVICE

(71) Applicant: NIHON PLAST CO., LTD., Shizuoka (JP)

(72) Inventors: Takaaki Seki, Shizuoka (JP); Ken Sasaki, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 285 days.

(21) Appl. No.: 14/793,968

(22) Filed: Jul. 8, 2015

(65) Prior Publication Data

US 2016/0009310 A1    Jan. 14, 2016

(30) Foreign Application Priority Data

Jul. 9, 2014    (JP) ................................ 2014-141657

(51) Int. Cl.
*B62D 1/06* (2006.01)
*H05B 3/34* (2006.01)
(Continued)

(52) U.S. Cl.
CPC ............... *B62D 1/06* (2013.01); *B62D 1/065* (2013.01); *H05B 3/34* (2013.01); *H05B 3/16* (2013.01); *H05B 3/36* (2013.01); *H05B 2203/014* (2013.01)

(58) Field of Classification Search
None
See application file for complete search history.

(56) References Cited

U.S. PATENT DOCUMENTS 6,093,908 A * 7/2000 Haag .................. B62D 1/065
                                                  219/204
2011/0073582 A1* 3/2011 Morita ................ B62D 1/065
                                                  219/204
(Continued)

FOREIGN PATENT DOCUMENTS

JP    60-157365 U    10/1985
JP    61-218475 A     9/1986
(Continued)

OTHER PUBLICATIONS

JP 61-218475 A, Heater for Steering Wheel, Kazuji et al, Sep. 1986, partial translation.*

(Continued)

*Primary Examiner* — Joseph M Pelham
(74) *Attorney, Agent, or Firm* — Brundidge & Stanger, P.C.

(57) ABSTRACT

A steering device is disclosed in which multiple notches are formed at two edge portions of a sheet-shaped base member by partially cutting out the sheet-shaped base member. An enlarged portion that is an enlarged part of each notch is formed at a leading end position of the notch. The two edge portions of the base member are wound along a cover portion while facing each other at an inner side of a curved portion of the cover portion. The enlarged portions cancel out a difference in length between the outer and inner sides due to the curved portion of the cover portion, thereby enabling suppression of formation of a wrinkle of the base member. The steering device can have a good appearance and provide a good touch-feeling to a driver when the driver holds the steering device in a state where the heater is covered by a skin portion.

3 Claims, 10 Drawing Sheets

(51) Int. Cl.
    *H05B 3/36*         (2006.01)
    *H05B 3/16*         (2006.01)

(56)           References Cited

U.S. PATENT DOCUMENTS

| | | | |
|---|---|---|---|
| 2011/0233183 A1* | 9/2011 | Saunders | B32B 7/12 |
| | | | 219/204 |
| 2013/0068748 A1* | 3/2013 | Csonti | H05B 3/34 |
| | | | 219/202 |
| 2015/0034622 A1* | 2/2015 | Sasaki | H05B 3/34 |
| | | | 219/204 |
| 2015/0122790 A1* | 5/2015 | Yamada | B62D 1/065 |
| | | | 219/204 |
| 2015/0353119 A1* | 12/2015 | Ohira | B62D 1/065 |
| | | | 219/204 |

FOREIGN PATENT DOCUMENTS

| | | | | |
|---|---|---|---|---|
| JP | 04-051886 U | | 4/1992 | |
| JP | 04-128991 U | | 11/1992 | |
| JP | 2007-062422 A | | 3/2007 | |
| JP | 2011-121477 A | | 6/2011 | |
| JP | 2012-171551 A | | 9/2012 | |
| JP | 2014143163 A | * | 8/2014 | ............ B62D 1/065 |
| WO | WO 2016096815 A1 | * | 6/2016 | ............ B62D 1/046 |

OTHER PUBLICATIONS

JP 2014-143163A, Saito et al, "Heater Unit and Steering Wheel," partial translation.*

* cited by examiner

STEERING DEVICE

CROSS REFERENCE TO RELATED APPLICATION

This application is entitled to the benefit of Japanese Patent Application No. 2014-141657 filed on Jul. 9, 2014, the disclosure of which including the specification, drawings and abstract is incorporated herein by reference in its entirety.

TECHNICAL FIELD

The present invention relates to a steering device including a heater installed to a cover portion.

BACKGROUND ART

In recent years, electric vehicles (EVs), which involve less environmental burdens, have become popular and been adopted as replacements for gasoline-engine vehicles for an approach to conserve the global environment and to reduce the production of greenhouse gases. Such an electric vehicle includes a combination of a storage battery and a motor and basically needs to charge power from an external charger. For this reason, measures to reduce the consumption of battery power are required for the electric vehicles. In this respect, reducing the power consumption for heating (air conditioning), which requires a large amount of power consumption, is the most effective solution among the measures.

To this end, adopting a technique to directly conduct heat to a passenger (driver) via a steering wheel to be directly held by the passenger has begun. As an example of the technique, a configuration in which a heating wire serving as a heating element is embedded in the steering wheel is known.

More specifically, incorporating a heater into a steering wheel makes it possible to heat the steering wheel during a period even a little after the engine starts, i.e., even when each engine part is not yet heated enough. This configuration can reduce the opportunity to use heating and thus can reduce the power consumption while mitigating operational difficulty and/or discomfort caused by the cold steering device, for example, when a driver starts an automobile that has been parked outside in winter.

As an example of such a configuration, there is known a configuration in which a heater holding a heating wire on a sheet-shaped base member, for example, is wound around a cover portion having a linear shape or a three dimensional shape such as an annular shape. When a heater is wound around a cover portion that curves in an annular shape, for example, a wrinkle is formed at an inner circumferential position due to a difference in circumferential length between the inner circumferential and outer circumferential regions of the cover portion. Such a wrinkle appears as an observable irregularity in a state where the heater is covered by a skin portion, and thus deteriorates the touch-feeling of the steering wheel when the driver holds the steering wheel. In order to solve this problem, there is known a configuration in which notches are formed at two edges of the base member to cancel out the difference in circumferential length (see, e.g., Patent Literature (hereinafter, referred to as "PTL") 1).

However, forming simple V-shaped or U-shaped slits (notches) at two edges of the base member alone is not sufficient, and a wrinkle or a rising portion of the base member is still formed at a position around the top of a notch when a heater is wound around the cover portion. For this reason, forming slits is not sufficient for preventing formation of wrinkles.

Moreover, there is known a configuration in which a heating wire is embedded in a sheet-shaped member by hot-pressing or the like (e.g., PTL 2).

In this configuration, the heater does not stretch well, and a wrinkle is easily formed in a state where the heater is wound around the cover member.

Furthermore, there is a known configuration in which a projection formed on a cover portion in a protruding manner is fitted into an opening formed in the base member for alignment when a sheet-shaped heater is wound around a linear cylindrical-shaped cover portion as a steering device of a motorcycle, for example (e.g., see PTL 3).

However, this configuration cannot be employed for automobile steering wheels. In the case of automobile steering wheels, the driver holds and grips the steering wheel during the operation of the automobile, so that it is likely that the driver feels the projection formed in a protruding manner in the cover member through a skin portion made of a soft material such as leather or urethane, for example, and it is thus difficult to make the driver comfortable with this configuration.

Meanwhile, there is another known configuration in which a large number of slits are formed in a base member of a sheet-shaped heater, so that the base member can be adhered to a curved cover portion while following the shape of the cover portion (e.g., see PTL 4).

In this configuration, an edge portion of the slit rises from the surface at an outer position of the curved part, thus forming a wrinkle.

CITATION LIST

Patent Literature

PTL 1
Japanese Patent Application Laid-Open No. SHO 61-218475 (pages 2 and 3 and FIGS. 1 through 4)
PTL 2
Japanese Patent Application Laid-Open No. 2011-121477 (pages 4 to 6 and FIGS. 1 through 3)
PTL 3
Japanese Utility Model (Registration) Application Laid-open No. HEI 4-51886 (pages 17 and 18 and FIGS. 5 and 6)
PTL 4
Japanese Utility Model (Registration) Application Laid-open No. HEI 4-128991 (pages 5 and 6 and FIGS. 2 through 8)

SUMMARY OF INVENTION

Technical Problem

As described above, there is a demand for a configuration that makes a good appearance and that provides a good touch-feeling when the steering wheel is held, for a steering device in which a sheet-shaped heater is wound around a cover portion.

The present invention takes the above mentioned points into consideration and aims to provide a steering device that has a good appearance and that provides a good touch-feeling when the steering device is held.

Solution to Problem

A steering device according to a first aspect includes: a grip-part core metal; a cover portion that is formed while covering the grip-part core metal and that has a partially curved portion at least; a heater that is attached to the cover portion; and a skin portion that covers the heater, in which the heater includes: a sheet-shaped base member that is wound along the cover portion while two edge portions of the sheet-shaped member are placed to face each other at an inner side of the curved portion of the cover portion, a heating wire that is held by the sheet-shaped base member integrally and that is configured to generate heat by energization, and a plurality of notches each having an enlarged portion at a leading end position of the notch, the enlarged portion being an enlarged part of the notch, the notches being formed at each of the two edge portions of the base member by partially cutting out the base member.

A steering device according to a second aspect is the steering device according to the first aspect, in which the base member is stretchable at least toward the two edge portions of the base member.

A steering device according to a third aspect is the steering device according to the first aspect, in which the base member includes a plurality of holes along each of the two edge portions of the base member.

A steering device according to a fourth aspect is the steering device according to the first aspect, in which the cover portion includes a mark, in which the base member includes an opening in order for the mark to be exposed through the opening when the base member is wound around the cover portion.

Advantageous Effects of Invention

With the steering device according to the first aspect, an enlarged portion that is an enlarge part of each of the multiple notches is formed at a leading end position of the notch formed at each of the two edge portions of the sheet-shaped base member by partially cutting out the base member, and the base member is would along the cover portion while the two edge portions of the base member are placed to face each other at an inner side of a curved portion of the cover portion. Thus, the enlarged portions cancel out a difference in length between the outer and inner sides due to the curved portion of the cover portion, thereby making it possible to suppress formation of a wrinkle of the base member. The steering device can have a good appearance and provide a good touch-feeling to a driver when the driver holds the steering device in a state where the heater is covered by the skin portion.

With the steering device according to the second aspect, in addition to the effects obtained with the steering device according to the first aspect, the effect of more effectively suppressing formation of a wrinkle of the base member when the base member is wound along the cover portion can be obtained by making the base member stretchable toward the two edge portions.

With the steering device according to the third aspect, in addition to the effects obtained with the steering device according to the second aspect, the effect of more effectively suppressing formation of a wrinkle of the base member when the base member is wound along the cover portion can be obtained by forming multiple holes along each of the edge portions of the base member, thereby making the base member more effectively stretchable toward the two edge portions.

With the steering device according to the fourth aspect, the openings for exposing a mark formed on the cover portion to be exposed through the openings are formed in the base member. Thus, in addition to the effects obtained according to any one of the first to the third aspects, alignment of the openings and mark while the mark is visually recognized through the openings when the base member is wound along the cover portion provides a favorable operation performance, allows the heater to be surely installed at a desired position of the cover portion, and makes it possible to more effectively suppress formation of a wrinkle of the base member caused by a misalignment of the heater.

DESCRIPTION OF EMBODIMENTS

First Embodiment

Figure 1A:
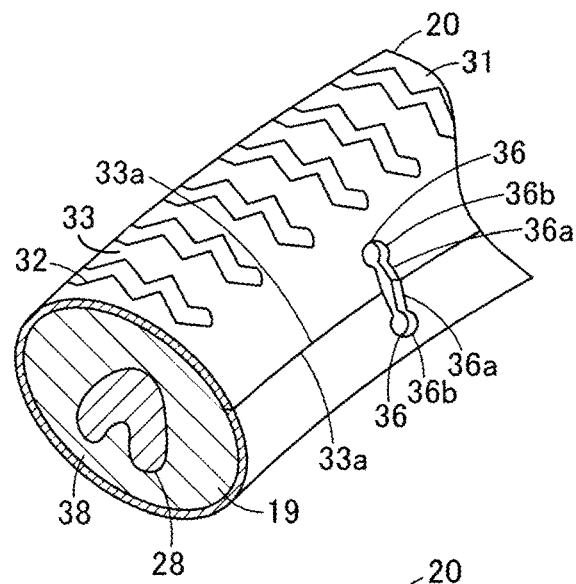
FIG. 1A is a perspective cross-sectional view of a part of a steering device according to a first embodiment of the present invention.

Hereinafter, a description will be given of a steering device according to a first embodiment of the present invention with reference to the accompanying drawings. Note that, the term "steering device" used in this description includes a steering wheel and a handle bar, for example.

In FIGS. 1A through 6, reference numeral 10 denotes a steering wheel that is a steering device of an automobile as a vehicle, for example. Steering wheel 10 includes: steering wheel main body 11, which serves as a steering main body; airbag unit (airbag module) 12, which is a center pad serving as a pad body attached to a passenger side of steering wheel main body 11; and finisher 13, which serves as a decorative member. Steering wheel 10 is attached to a steering shaft installed obliquely to a vehicle, normally. However, a description will be given while the upper direction of airbag unit 12 (direction indicated by arrow U) is referred to as an upper side; the lower direction thereof (direction indicated by arrow D) is referred to as a lower side; the passenger side, i.e., the front side of airbag unit 12 is referred to as a near side; and the steering shaft side, i.e., the back side of airbag unit 12 is referred to as a front side. In other words, the description will be given while the front side of the vehicle, i.e., the upper front side of the windshield side is referred to as a front side; and the rear side of the vehicle, i.e., the lower rear side of the vehicle is referred to as a rear side or a near side.

Steering wheel main body 11 includes: rim portion 15 (ring portion), which serves as a grip portion at least partially formed along a circumference in an annular shape (doughnut shape) in the first embodiment; boss portion 16, which is positioned at an inner side of rim portion 15; and multiple (three in this embodiment) spoke portions 17, which connect rim portion 15 and boss portion 16. In addition, steering wheel main body 11 includes: core metal 18, which is made of metal; cover portion 19, which is made of a soft synthetic resin and which integrally covers part of core metal 18; heater 20, which covers cover portion 19; skin portion 21, which covers heater 20; and a covering body serving as a covering member that covers the back side of core metal 18, or the like (not illustrated).

Core metal 18 is formed of magnesium aluminum (MgAl) alloy or iron, for example. Core metal 18 includes substantially cylindrical boss 25, which includes a serration structure to mesh with the steering shaft, at a lower portion of the vehicle body side of boss portion 16. In core metal 18, boss plate 26, which forms a core body also called a hub core, is integrally and fixedly attached to boss 25. In addition, spoke cored bars 27, which correspond to spoke portions 17, extend integrally from boss plate 26. Alternatively, spoke cored bars 27 are fixedly attached to boss plate 26 by welding, for example. Moreover, rim core metal 28, which serves as a grip-part core metal corresponding to rim portion 15, is fixedly attached to spoke cored bars 27 of spoke portions 17 by welding, for example.

Cover portion 19 is formed so as to cover the front surface side of the entire circumference of rim core metal 28 of rim portion 15 and the front surface side of spoke cored bars 27 of spoke portions 17 on the side of rim portion 15. Heater 20 is installed while covering cover portion 19. Skin portion 21 is installed while covering heater 20 and cover portion 19. For this reason, cover portion 19 curves (is bent) in an arc shape (annular shape) along rim core metal 28, i.e., at least part of the arc shape. In addition, marks 22 for alignment of heater 20 are formed on cover portion 19. In the first embodiment, a microcellular foamed soft polyurethane resin is used for cover portion 19, for example, and is molded by using a shaping mold (mold) separated into upper and lower parts (not illustrated).

Marks 22 are mark-off lines, for example, which are formed along the inner circumference in the direction of latitude line L (large diameter), which is a circumference of cover portion 19 at the position of rim portion 15. More specifically, marks 22 are formed at inner and outer circumferential sides of cover portion 19 in the direction of latitude line L during molding of cover portion 19. In other words, marks 22 are formed along an inner circumferential side position on a parting line serving as the center line of cover portion 19 in the up and down direction, i.e., an inner side position of a curving portion of cover portion 19. Note that, marks 22 may be formed simultaneously during molding of cover portion 19 or may be formed after molding of cover portion 19.

Heater 20 integrally includes base member 31, which has a sheet shape, and heating wire 32, which is held by base member 31.

Base member 31 is a nonwoven fabric, for example, and has a rectangular shape as a whole. Base member 31 integrally includes: rim cover portion 33, which serves as a first main body covering cover portion 19 at a position corresponding to rim portion 15 (rim cored bar 28); and spoke cover portions 34, which serve as second main bodies covering cover portion 19 at positions corresponding to the respective spoke portions 17 (spoke cored bars 27). Base member 31 is disposed while being bent so as to be wound along meridian M (small diameter), which is a cross-sectional circumference of cover portion 19 at a position of rim portion 15.

Rim cover portion 33 includes edge portions 33a, which are paired long sides along the longitudinal direction. When rim cover portion 33 is installed onto cover portion 19, two ends of rim cover portion 33 are connected to form an annular shape. Edge portions 33a are two side-edge portions of base member 31, and multiple notches 36, which serve as openings, are formed in each of edge portions 33a.

Each notch 36 cancels out a difference in circumferential length between the outer and inner circumferences in the direction of latitude line L (large diameter) when heater 20 is wound. Each notch 36 has a keyhole shape and includes: notch main body 36a, which is formed substantially linearly along the short-side direction from edge portions 33a toward the center direction of the short-side direction of rim cover portion 33; and enlarged portion 36b, which is integrally formed with notch main body 36a at a leading end portion of notch main body 36a. Notches 36, which are positioned at edge portions 33a, are formed at the positions facing each other in the short-side direction, for example.

Notch main body 36a is formed so as to be gradually reduced in width in a direction from a base end side to a leading end side (enlarged portion 36b), for example. When heater 20 is wound around cover portion 19, mark 22 is exposed at a base end side position (a position opposite to enlarged portion 36b) of notch main body 36a in order that the operator can visually recognize mark 22. Note that, the term "operator" herein refers to an individual who actually does the manufacturing work and/or operation of steering wheel 10.

Enlarged portion 36b is formed in a circular shape, for example. Enlarged portion 36b has a width dimension greater than the maximum width of notch main body 36a. In other words, enlarged portion 36b is formed so as expand in a step-like manner with respect to notch main body 36a.

Spoke cover portions 34 each protrude substantially in a square shape from edge portion 33a of rim cover portion 33. Spoke cover portions 34 are formed in a number corresponding to the number of spoke portions 17. In the first embodiment, three pairs of spoke cover portions 34 are formed for three spoke portions 17.

Heating wire 32 is formed by disposing an insulating film around the surface of a core line that generates heat during energization. As an example of the core line, a resistance line including nickel, for example, may be adopted. Heating wire 32 is disposed in a wave shape alternatively crossing with latitude line L over substantially the entire circumference of rim portion 15, for example. Stated differently, heating wire 32 has a wave shape alternatively crossing in the short-side direction of base member 31. In addition, heating wire 32 is connected to a controller circuit (not illustrated) and configured to generate heat when a current is applied by this controller circuit.

Skin portion 21 forms the outermost portion of rim portion 15 of steering wheel 10 while covering heater 20. Skin portion 21 may be molded using a soft synthetic resin such as urethane, for example, and thus formed in a state of being integrated with cover portion 19 with heater 20 embedded in the integrated body. Alternatively, skin portion 21 may be formed by additionally winding a sheet-shaped soft member such as leather so as to cover heater 20.

The controller circuit includes a thermostat, for example, and is electrically connected to two ends of heating wire 32 via a power feeding line (not illustrated). In addition, this controller circuit is placed between a cover body and spoke cored bar 27 of spoke portion 17 of steering wheel main body 11, for example.

In addition, the cover body may also be called, "rear cover," "lower cover" or "body cover" and is made of a synthetic resin and covers a lower part of boss portion 16.

Airbag unit 12 includes: a sack-like airbag; a resin-made cover body that covers a folded airbag; and an inflator configured to inject a gas. Airbag unit 12 is configured to quickly inject a gas to the inside of the airbag from the inflator to rapidly inflate the airbag housed in a folded state to break the cover body, thus inflating and deploying the airbag in front of a passenger to protect the passenger. Note that, a horn switch mechanism serving as a switch unit may be integrally incorporated into airbag unit 12.

Moreover, finisher 13 is formed of a synthetic resin, for example, in a longitudinal shape in the up and down direction along two sides of airbag unit 12, for example, and is disposed so as to cover the passenger side of the laterally positioned spoke portions 17. Various operational switches may be incorporated into finisher 13.

Hereinafter, a description will be given of steps of manufacturing steering wheel 10. First, core metal 18 is set in an open mold, and a synthetic resin material is stirred and mixed, and injected into a cavity. The synthetic resin material thus becomes polyurethane after reaction in the cavity. Cover portion 19 is formed by this polyurethane.

Next, the mold is opened to demold intermediate body 38 in which cover portion 19 is formed.

Meanwhile, heating wire 32 is fixedly attached by bonding, welding, or sewing or the like to base member 31 of a band shape in a wave shape alternately crossing in the longitudinal direction. Heater 20 is thus formed.

Figure 4A:
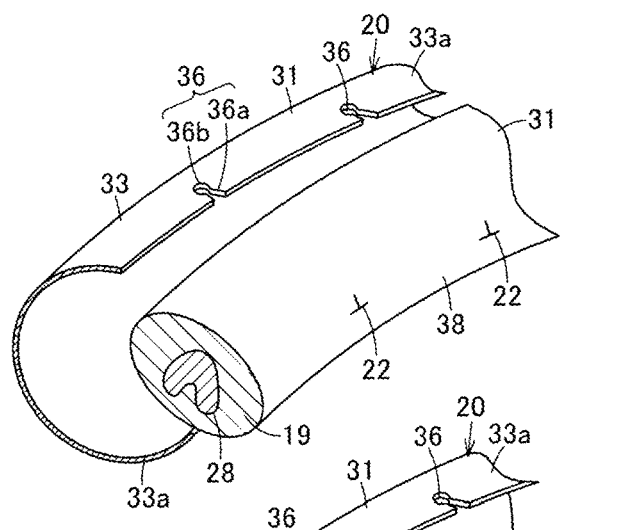
FIGS. 4A to 4D are perspective views sequentially illustrating the steps subsequent to the step of the manufacturing method for the steering device illustrated in FIG. 3.
Figure 4B:
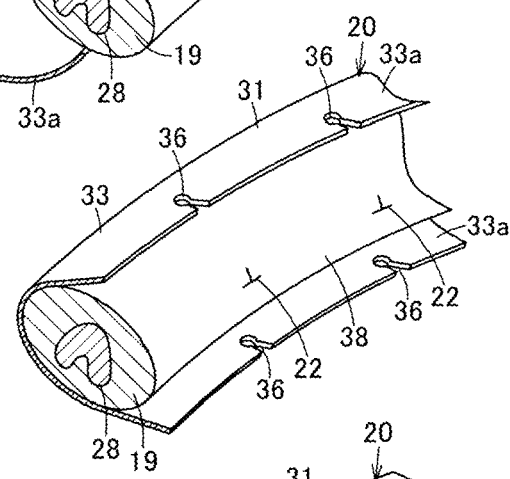
Figure 4C:
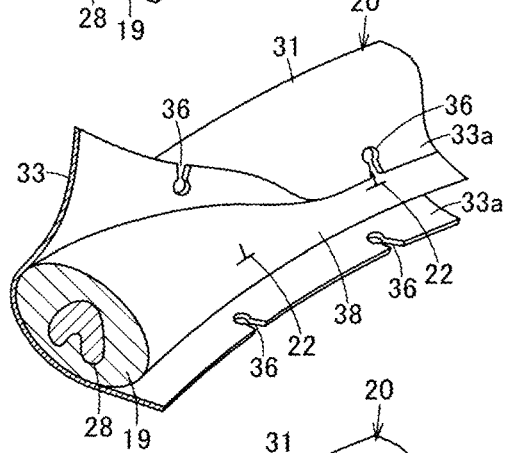
Figure 4D:
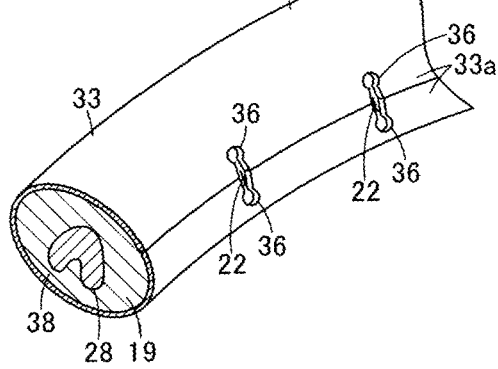
Figure 5:
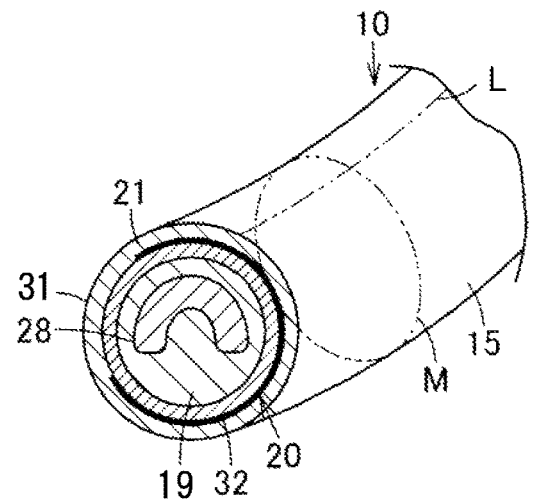
FIG. 5 is a perspective cross-sectional view of a part of the steering device.
Figure 6:
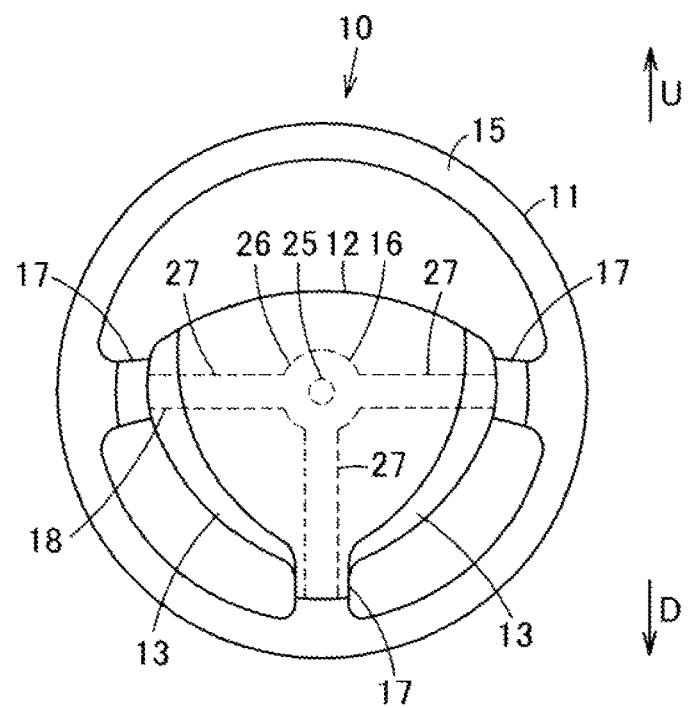
FIG. 6 is a front view of the steering device.

Heater 20 is wound around cover portion 19 of intermediate body 38 such that edge portions 33a of base member 31 face each other at the inner circumference side, i.e., the inner side of a curve portion of cover portion 19 (FIGS. 3, and 4A to 4D). At this time, the operator winds heater 20 so that edge portions 33a of base member 31 face each other along marks 22 while observing marks 22 through notches 36 (FIG. 4C). Thus, heater 20 (base member 31) is aligned with cover portion 19 (intermediate body 38) and prevented from being misaligned. As a result, the difference in circumferential length between the inner and outer circumference sides in the direction of latitude line L is canceled out. In addition, base member 31 does not concentrate around the leading end side because of the shape of enlarged portion 36b, which is the leading end portion of notch 36, so that formation of a wrinkle is prevented at the positions near notches 36.

Subsequently, heater 20 is fixed to cover portion 19 by joining edge portions 33a of base member 31 together by sewing or the like, and skin portion 21, which covers heater 20, is integrally molded with cover portion 19 or is wound around and fixed to cover portion 19 by sewing or the like with respect to the intermediate body to which heater 20 is fixed. Heating wire 32 is electrically connected to the controller circuit, and airbag unit 12 and finisher 13 are attached to intermediate body 38. Thus, steering wheel 10 is completed.

Figure 1B:
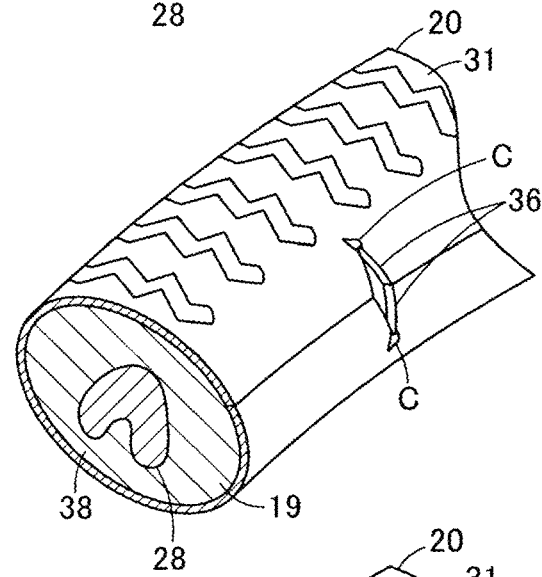
FIG. 1B is a perspective cross-sectional view of a part of a steering device according to a related art illustrated as a first comparison example.
Figure 1C:
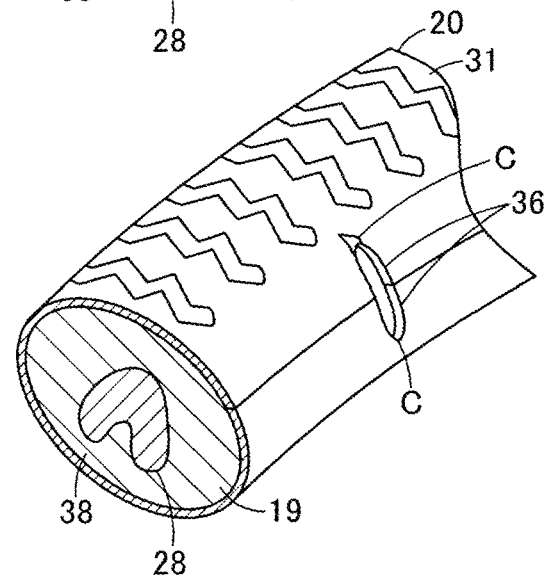
FIG. 1C is a perspective cross-sectional view of a part of a steering device according to a related art illustrated as a second comparison example.
Figure 2:
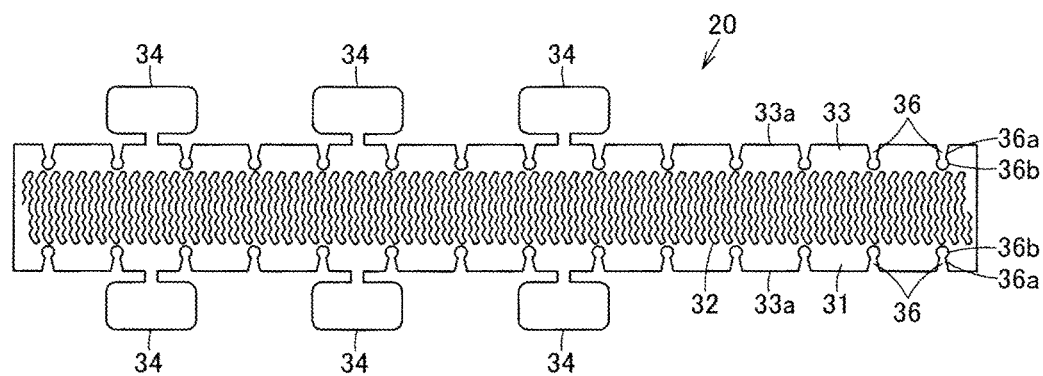
FIG. 2 is a plan view illustrating a heater of the steering device.
Figure 3:
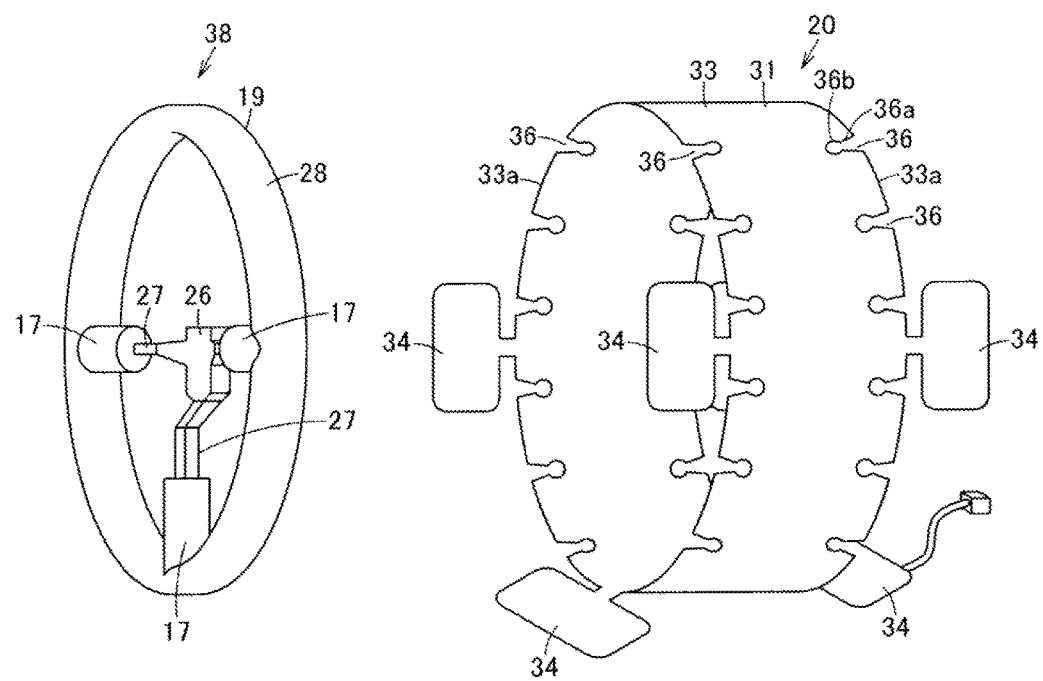
FIG. 3 is a perspective view illustrating a part of a manufacturing method for the steering device.

As illustrated in FIGS. 1B and 1C, forming simple V-shaped or U-shaped notches 36 in edge portions 33a of base member 31 alone is not sufficient for preventing a wrinkle, and wrinkle C is formed at each of the leading end portions of notches 36 because of the difference in length between the outer and inner sides of cover portion 19 caused by the curved portion of cover portion 19 (difference in circumferential length between the outer and inner circumferential sides of cover portion 19 of an arc shape). Such wrinkles C externally appear on rim portion 15 when skin portion 21 is wound. Thus, wrinkles C reduce the quality of touch-feeling of rim portion 15 when the driver grips rim portion 15. Meanwhile, according to the first embodiment, enlarged portions 36b, each being an enlarged portion, are formed at the leading end positions of multiple notches 36 formed at edge portions 33a of sheet-shaped base member 31 by partially cutting out sheet-shaped base member 31. Edge portions 33a of base member 31 are wound along cover portion 19 while facing each other at an inner side of a curved portion of cover portion 19. Thus, the difference in length between the inner and outer sides of cover portion 19 (difference in circumferential length between the outer and inner circumferences of cover portion 19 of an arc shape) because of the curved portion of cover portion 19 can be cancelled out by enlarged portions 33b, so that formation of a wrinkle of base member 31 can be prevented (FIG. 1A). In addition, according to the first embodiment, the steering wheel can have a good appearance and provide a good touch-feeling to the driver when the driver holds rim portion 15 (grips rim portion 15).

Moreover, according to the first embodiment, marks 22, each being formed on cover portion 19, are exposed through notches 36, so that the operator can align notches 36 with marks 22 while visually recognizing marks 22 through notches 36 when winding base member 31 around cover portion 19. Thus, the operation performance is favorable, and heater 20 can be surely attached to a desired position of cover portion 19, so that formation of a wrinkle of base member 31 caused by misalignment of heater 20 can be more effectively prevented.

Second Embodiment

Next, a description will be given of a second embodiment with reference to FIGS. 7 and 8. Note that, the components and effects identical to those of the first embodiment are assigned the same reference numerals, and the description of these components and effects will not be repeated, hereinafter.

The second embodiment is different from the first embodiment in that openings 41 for alignment are formed in base member 31 of heater 20.

Multiple openings 41 are formed while being spaced apart from each other in the longitudinal direction along a center portion of base member 31 in the short-side direction, for example. Stated differently, openings 41 are positioned on the outer circumferential side in the direction of latitude line L (large diameter) in a state where heater 20 is wound around cover portion 19. Moreover, openings 41 are each formed in a circular shape, for example.

Moreover, mark 43 is formed on cover portion 19 so as to be exposed through openings 41. Mark 43 is parting line PL on the outer circumferential side of cover portion 19 in the direction of latitude line L.

Figure 7:
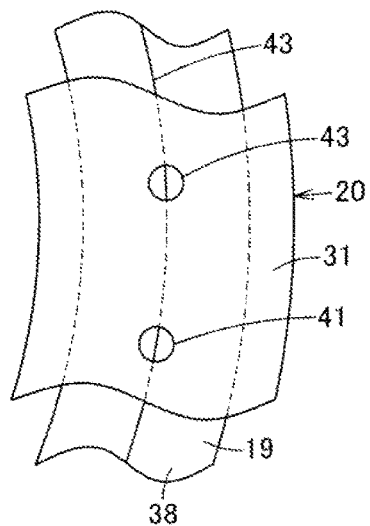
FIG. 7 is an enlarged perspective view illustrating a part of a manufacturing method for a steering device according to a second embodiment of the present invention.
Figure 8:
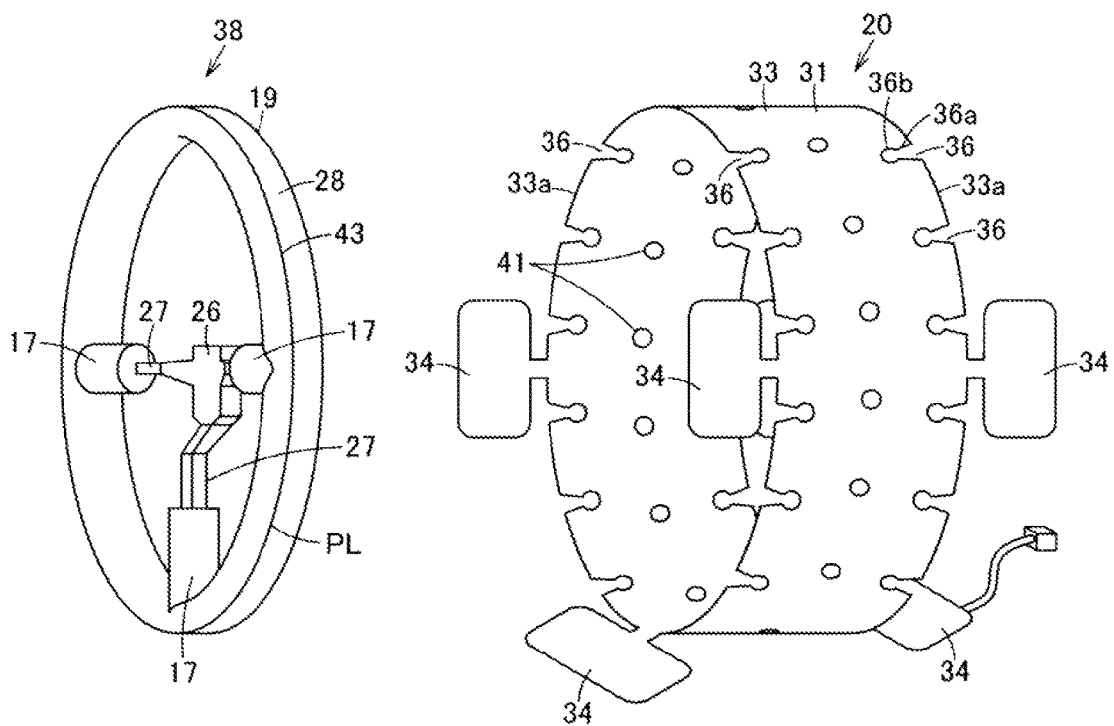
FIG. 8 is a perspective view illustrating a part of the manufacturing method for a steering device.

When winding heater 20 (base member 31) around cover portion 19 of intermediate body 38, the operator does the work while visually recognizing mark 43 through openings 41 (FIG. 7). Thus, heater 20 (base member 31) can be aligned with cover portion 19 (intermediate body 38) and prevented from being misaligned.

As described above, according to the second embodiment, mark 43, which is a parting line formed on cover portion 19, is exposed through multiple openings 41. Thus, the operator can align mark 43 with openings 41 while visually recognizing mark 43 through openings 41 when winding base member 31 around cover portion 19. For this reason, the operation performance is favorable, and heater 20 can be surely attached to a desired position of cover portion 19, so that formation of a wrinkle of base member 31 caused by misalignment of heater 20 can be more effectively prevented.

Moreover, when heater 20 is attached to cover portion 19, parting line PL on the outer circumferential side of cover portion 19, which becomes a center line of cover portion 19 is hidden by heater 20. For this reason, alignment of the center positions of heater 20 (base member 31) and cover portion 19 is not easy, and the quality of alignment may be affected by the intuition of the operator. Moreover, when heater 20 is disposed at a position shifted from the desired position with respect to cover portion 19, the effect of reducing formation of a wrinkle by enlarged portions 36b of notches 36 may not be brought about. Thus, exposing mark 43, which is parting line PL serving as the center position of cover portion 19, through openings 41 formed by making holes along the center position of base member 31 allows the operator to accurately align (perform centering of) heater 20 via mark 43. For this reason, differences among individual operators when the operators attach heater 20 to cover portion 19 are reduced, which allows a not-very-experienced operator to perform the installation and to suppress formation of a wrinkle. Thus, the manufacturing quality of steering wheel 10 can be improved.

Figure 9:
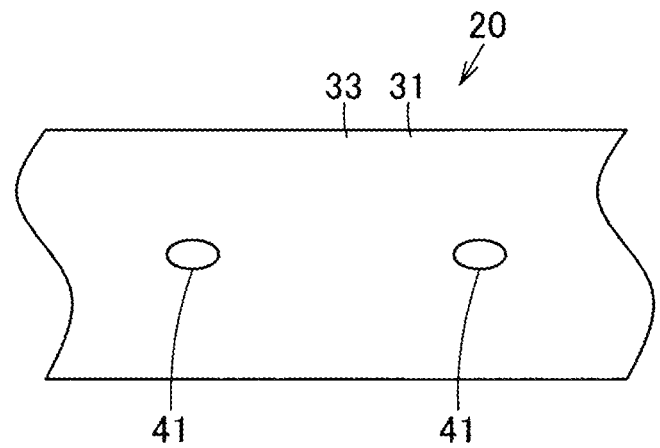
FIG. 9 is a plan view illustrating openings for a steering device according to a third embodiment of the present invention.
Figure 10:
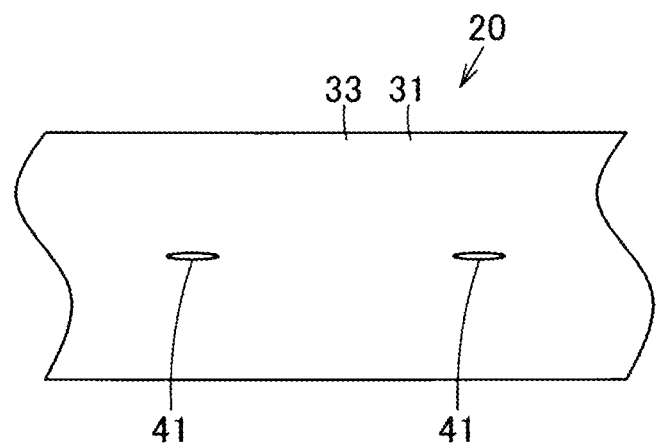
FIG. 10 is a plan view illustrating openings for a steering device according to a fourth embodiment of the present invention.
Figure 11:
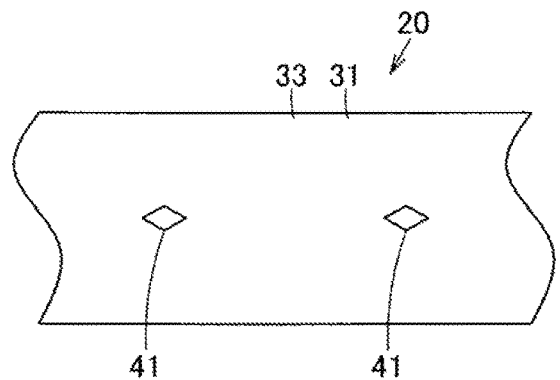
FIG. 11 is a plan view illustrating openings for a steering device according to a fifth embodiment of the present invention.
Figure 12:
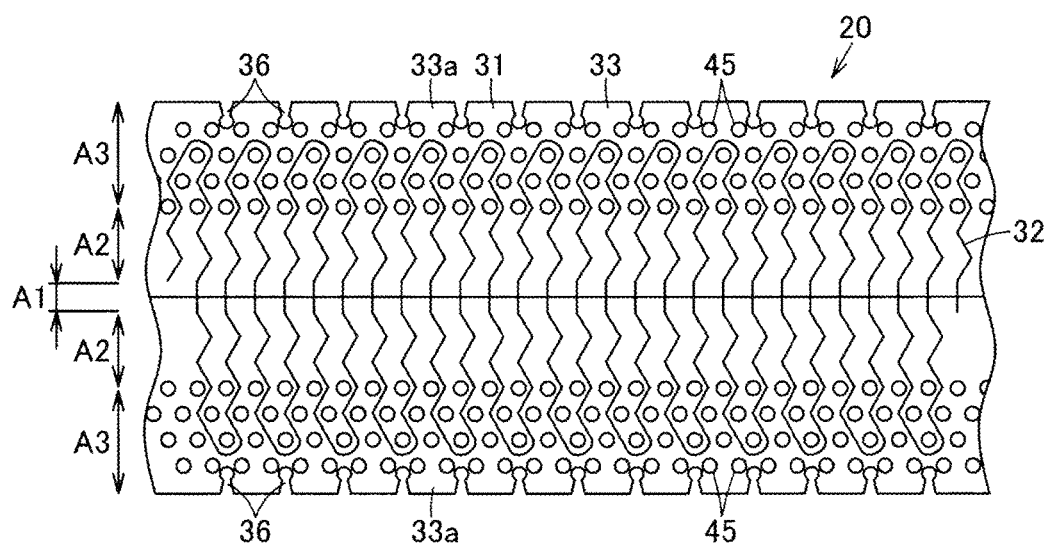
FIG. 12 is a plan view illustrating a heater of a steering device according to a sixth embodiment of the present invention.

Note that, in the second embodiment, the shape of each opening 41 may be an oval (ellipse) shape having a long axis along the longitudinal direction of base member 31 as in a third embodiment illustrated in FIG. 9. Alternatively, the shape of each opening 41 may be in an elongated slit shape along the longitudinal direction of base member 31 as in a fourth embodiment illustrated in FIG. 10. Alternatively, the shape of opening 41 may be a long rhomboid (square) shape along the longitudinal direction of base member 31 as in a fifth embodiment illustrated in FIG. 11. In these cases, the operator can more easily align mark 43 and the center positions of openings 41, which extend linearly along latitude line L. For this reason, the operation performance is favorable, and heater 20 can be more surely attached to a desired position of cover portion 19 in these cases. Accordingly, openings 41 may be formed in an optional shape for exposing mark 43 to allow the operator to visually recognize mark 43.

Sixth Embodiment

Next, a description will be given of a sixth embodiment with reference to FIGS. 12 and 13A through 13C. Note that, the components and effects identical to those of the embodiments described above are assigned the same reference numerals, and the description of these components and effects will not be repeated, hereinafter.

In the sixth embodiment, base member 31 of heater 20 according to the embodiments described above is formed so as to be stretchable at least in the direction of edge portions 33a, that is, in the short-side direction of base member 31.

More specifically, multiple holes 45 are formed in base member 31 near edge portions 33a in addition to notches 36. These holes 45 are each formed in a circular shape, for example. Holes 45 linearly form a row along the longitudinal direction of base member 31, and multiple rows of holes 45 are formed in the short-side direction of base member 31. In addition, holes 45 in rows adjacent to each to other are shifted from each other in the longitudinal direction of base member 31. More specifically, holes 45 are arranged in a zigzag shape (arranged alternately in the longitudinal direction of base member 31) at positions not interfering with heating wire 32. Moreover, holes 45 are arranged from more center side positions of base member 31 than end portions of base member 31 in the short-side direction where heating wire 32, which is disposed in a wave shape on base member 31, is alternately folded, toward positions closer to edge portions 33a than the end portions. More specifically, base member 31 gradually increases in stretch rate from the center side positions of base member 31 to edge portions 33a in the short-side direction of base member 31. Stated differently, region A1 of base member 31, which has a predetermined width in the short-side direction from the center position of base member 31 in the short-side direction, is hard to stretch. Meanwhile, regions A2, which extend from region A1 to holes 45, are easier to stretch than region A1. In addition, regions A3, which extend to edge portions 33a and which include holes 45 and the folded end portions of heating wire 32, are the easiest to stretch.

Figure 13A:
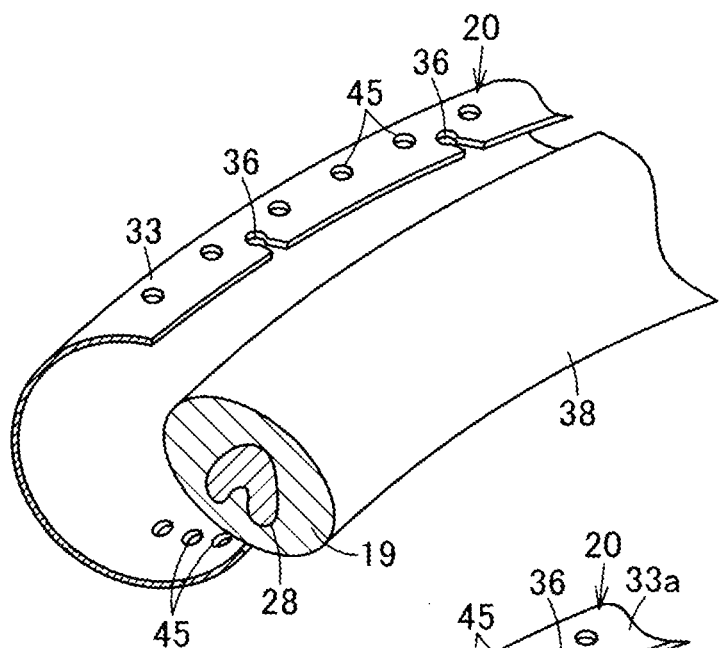
FIGS. 13A to 13C are perspective views sequentially illustrating steps of a manufacturing method for the steering device.
Figure 13B:
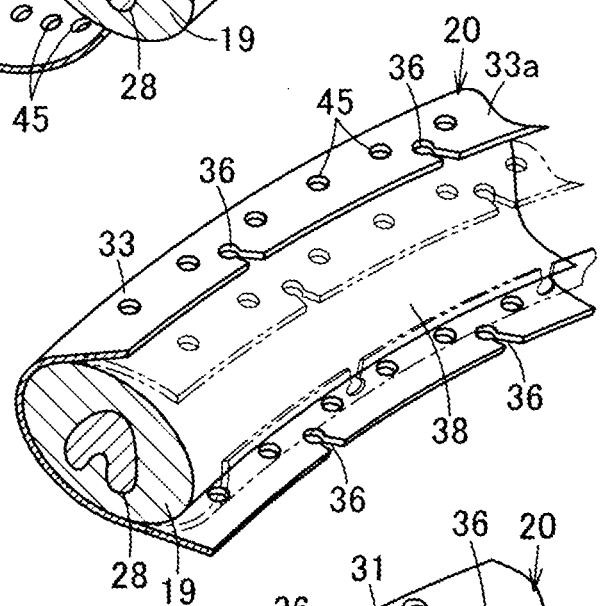
Figure 13C:
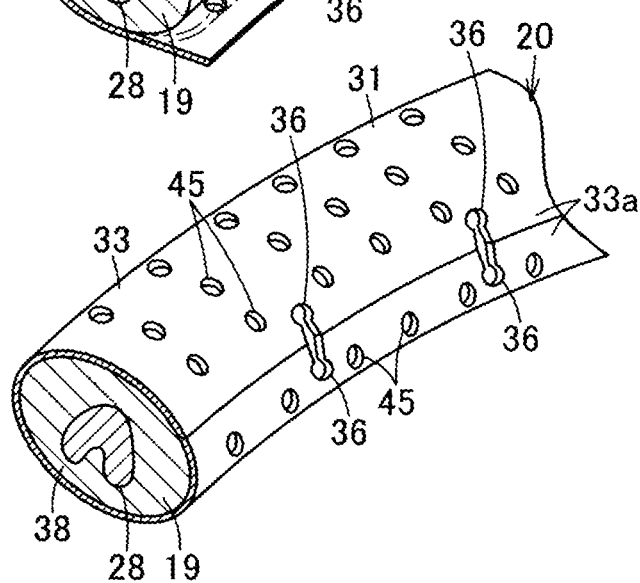
Figure 14:
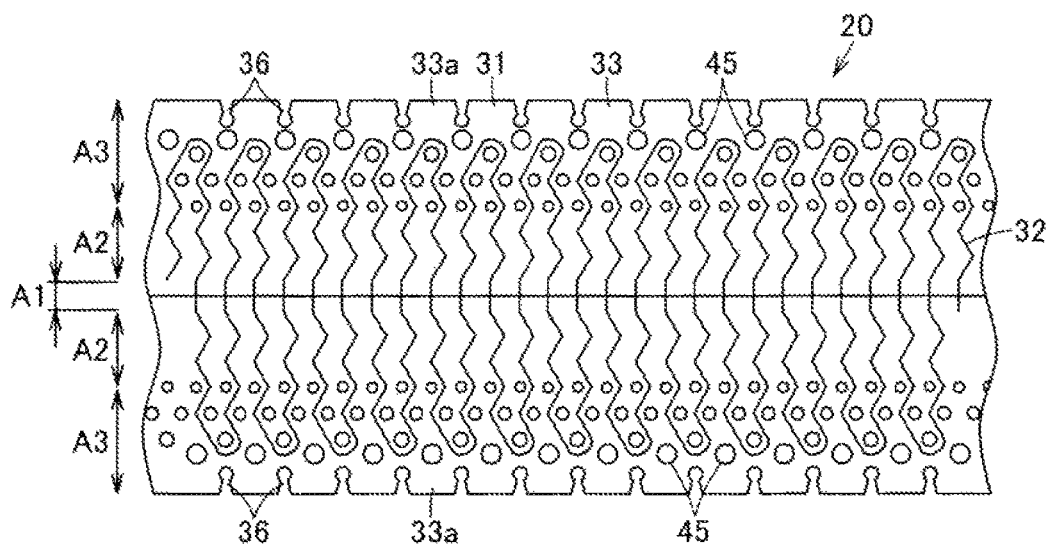
FIG. 14 is a plan view illustrating a heater of a steering device according to a seventh embodiment of the present invention.

Heater 20 is wound around cover portion 19 of intermediate body 38 while edge portions 33a of base member 31 are stretched with tension applied so as to face each other at the inner circumferential side, that is, at the inner side of a curved portion of cover portion 19. In this state, edge portions 33a of base member 31 are joined together by sewing or the like and thereby fixed to cover portion 19 (FIGS. 13A to 13C). Note that, although not illustrated, as in each of the embodiments, use of notches 36 and marks 22, or use of openings 41 and mark 43 allows the operator to easily align the center position of heater 20 with the center portion of cover portion 19.

As described above, according to the sixth embodiment, making edge portions 33a of base member 31 stretchable can more effectively suppress formation of a wrinkle of base member 31 when base member 31 is wound along cover portion 19.

Note that, when a large slit is formed at a center position of base member 31, for example, heater 20 (base member 31) easily goes loose when wound around cover portion 19. In addition, base member 31 easily deforms, so that it is hard to wind base member 31 with tension applied in this case. Moreover, when the slit area is large, base member 31 deforms too much, and cannot keep the original shape, so that a wrinkle may be formed. In this respect, multiple holes 45 are formed along each of edge portions 33a of base member 31. Thus, base member 31 can more effectively stretch toward edge portions 33a of base member 31. In addition, it is made harder to generate an origin of a wrinkle, and even if a wrinkle is formed, such a wrinkle can be kept to the minimum. Moreover, even when tension is applied to a position where edge portions 33a are sewed, a wrinkle is not easily formed in base member 31. Accordingly, formation of a wrinkle that may occur when base member 31 is wound along cover portion 19 can be suppressed more effectively.

Moreover, according to the sixth embodiment, region A1 at a center side position of base member 31 in the short-side direction, which serves as the basis for winding heater 20 around cover portion 19, is made relatively hard to stretch. Thus, as in the case of the second embodiment in particular, when the operator aligns heater 20 with cover portion 19 by alignment of mark 43, which is parting line PL on the outer circumferential side of cover portion 19, and openings 41, which are formed along the center position of base member 31 in the short-side direction, stretching of base member 31 around openings 41 can be suppressed. For this reason, the operation performance becomes favorable, and alignment accuracy can be further improved.

If the entirety of base member 31 is configured to stretch, the alignment accuracy of edge portions 33a may deteriorate because base member 31 stretches too much when base member 31 is would around cover portion 19. For this reason, configuring regions A3, which are close to edge portions 33a, to stretch to a relatively large extent can further improve the operation performance for winding of base member 31.

In addition, when edge portions 33a of base member 31 are sewed, for example, for fixing heater 20 to cover portion 19 while covering cover portion 19, heating wire 32 stretches as well while following base member 31 because multiple holes 45 are formed near edge portions 33a to be sewed. Thus, the operation performance for sewing can be further improved in this case.

In addition, forming holes 45 in base member 31 in a zigzag shape (alternately in the longitudinal direction) can further improve the stretchability of base member 31 at regions A3.

Moreover, holes 45, which are relatively small, make it possible to prevent base member 31 from losing shape when base member 31 stretches, thus, making it easier to wind heater 20 (base member 31) around cover portion 19.

Figure 15:
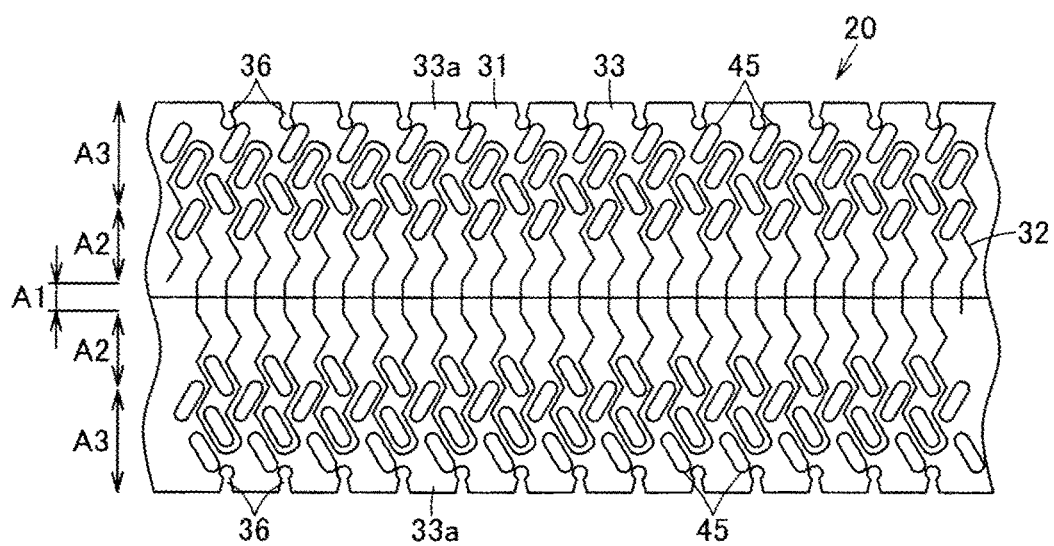
FIG. 15 is a plan view illustrating a heater of a steering device according to an eighth embodiment of the present invention.
Figure 16:
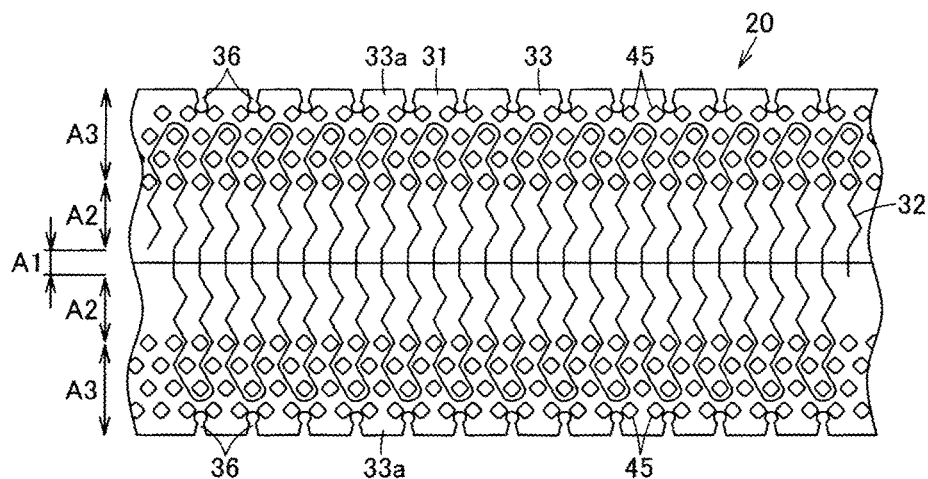
FIG. 16 is a plan view illustrating a heater of a steering device according to a ninth embodiment of the present invention.

In the sixth embodiment, holes 45 may be formed so as to gradually increase in size as the positions of holes 45 become close to edge portions 33a in a direction from the center side of base member 31 in the short-side direction in order that base member 31 can have a larger stretchability (can be more stretchable) as the position of base member 31 becomes closer to edge portions 33a. In the sixth and seventh embodiments, the shape of each hole 45 may be rectangular as in an eight embodiment illustrated in FIG. 15, for example, or square (rhomboid) as in a ninth embodiment illustrated in FIG. 16.

Figure 17:
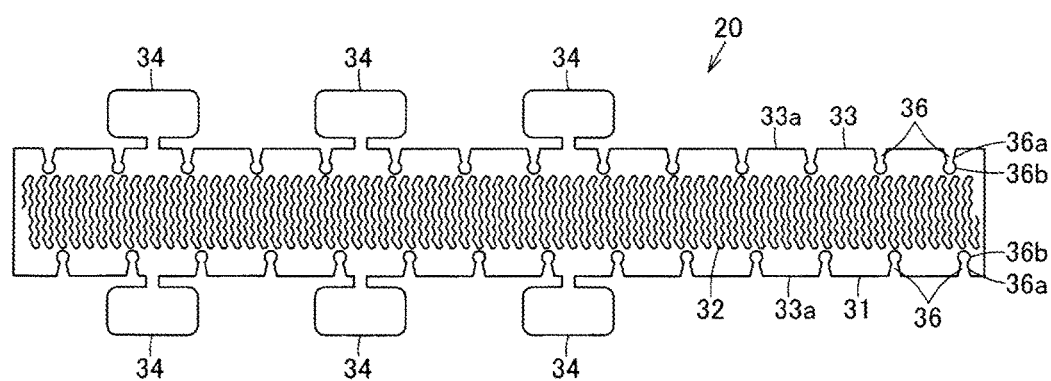
FIG. 17 is a plan view illustrating a heater of a steering device according to a tenth embodiment of the present invention.

Moreover, in each of the embodiments, notches 36 of edge portions 33a of base member 31 may be formed in a zigzag shape, that is, at alternately shifted positions as in a tenth embodiment illustrated in FIG. 17.

Notch main body 36a of each notch 36 may be linearly formed to have substantially a constant width dimension toward the leading end portion (enlarged portion) from the base end portion, for example.

Furthermore, how heating wire 32 is placed on base member 31 is not limited to a wave shape, and may be placed in an optional shape corresponding to the shape of base member 31 or cover portion 19 such as a spiral shape, for example.

In addition, examples of employable heater 20 include one that is obtained by forming base member 31 using polyvinyl chloride (PVC), for example, and integrating base member 31 thus formed with heating wire 32 as heater foils, and a so-called silicon rubber heater capable of performing instantaneous heating that requires a high wattage. Such a silicon rubber heater includes a silicon rubber for base member 31, for example, and flat heating wire 32 is held by base member 31.

In each of the embodiments, rim portion 15 (rim core metal 28 and cover portion 19) is formed in an annular shape. However, rim portion 15 may be formed so as to curve along a part of circular arc, or to have a partially curved linear shape. More specifically, rim portion 15 (rim cored metal 28 and cover portion 19) may be formed in any shape as long as the shape includes at least a curved (or bent) portion. In any of these shapes, winding heater 20 in such a way that edge portions 33a of base member 31 face each other at an inner side of this curved portion can bring about the same operational effects as those obtained in each of the embodiments described above.

In addition, steering wheel 10 is not limited to the configuration including three spoke portions 17, and may be applied to a configuration including at least two spoke portions 17 on two lateral sides, respectively.

Moreover, steering wheel 10 can be employed as a steering wheel not only for a vehicle such as an automobile, but also for any machine.

Moreover, a pad body that houses a shock absorber, for example, may be used instead of airbag unit 12.

INDUSTRIAL APPLICABILITY

The present invention can be favorably used for a steering wheel of an automobile, for example.

REFERENCE SIGNS LIST

10 Steering wheel serving as a steering device
19 Cover portion
20 Heater
21 Skin portion
22, 43 Mark
28 Rim core metal serving as a grip-part core metal
31 Base member
32 Heating wire
36 Notch serving as an opening
36b Enlarged portion
41 Opening portion
45 Hole portion

The invention claimed is:
1. A steering device comprising:
a grip-part core metal that is formed at least partially along a circumferential direction of the steering device;

a cover portion that covers the grip-part core metal;
a heater that is attached to the cover portion; and
a skin portion that covers the heater, wherein the heater includes:
- a sheet-shaped base member having a rectangular shape including long and short directions, which is long in one direction and short in a direction perpendicular to the one direction, wherein the sheet-shaped base member is formed to be stretchable in the short direction of the sheet-shaped base member and to gradually increase in stretch rate from a center of the sheet-shaped base member to two edge portions thereof, and wherein the sheet shaped base member is wound along the cover portion such that the two edge portions of the sheet-shaped base member along the long direction thereof are placed to face each other at an inner circumferential side of the steering device;
- a heating wire that is held by the sheet-shaped base member integrally and that is configured to generate heat by energization; and
- a plurality of notches that each includes a notch main body and an enlarged portion, the notch main body being formed from one of the two edge portions of the sheet-shaped base member toward the center of the sheet-shaped base member in the short direction thereof, and the enlarged portion being enlarged at a leading end portion of the notch main body toward the center of the sheet-shaped base member in the short direction thereof.

2. The steering device according to claim 1, wherein the sheet-shaped base member includes a plurality of holes along each of the two edge portions of the sheet-shaped base member.

3. The steering device according to claim 1, wherein the cover portion includes a mark, and wherein the sheet-shaped base member includes an opening that enables the mark of the cover portion to be exposed through the opening when the sheet-shaped base member is wound around the cover portion.

* * * * *